United States Patent

Rasmussen

[11] Patent Number: 5,865,139
[45] Date of Patent: Feb. 2, 1999

[54] FEEDING DEVICE

[75] Inventor: Henrik Rasmussen, Nykoebing Sjaelland, Denmark

[73] Assignee: Egebjerg Maskinfabrik af 1983 A/S, Nykoebing Sjaelland, Denmark

[21] Appl. No.: 702,660
[22] PCT Filed: Mar. 10, 1995
[86] PCT No.: PCT/DK95/00116
   § 371 Date: Sep. 6, 1996
   § 102(e) Date: Sep. 6, 1996
[87] PCT Pub. No.: WO95/24120
   PCT Pub. Date: Sep. 14, 1995

[30] Foreign Application Priority Data

Mar. 11, 1994 [DK] Denmark ............... 94 00123

[51] Int. Cl.⁶ ................................................. A01K 1/10
[52] U.S. Cl. ........................................ 119/53.5; 119/54
[58] Field of Search .................... 119/53, 54, 53.5, 119/222

[56] References Cited

U.S. PATENT DOCUMENTS 5,243,930  9/1993  Rahm ........................................ 119/54
5,263,437  11/1993  Murphrey ............................. 119/53.5
5,447,119  9/1995  Rasmussen ............................. 119/51.5

FOREIGN PATENT DOCUMENTS 2660155  10/1991  France ............................. A01K 5/00
1632979  1/1971  Germany ......................... A01K 5/02
2652788  8/1984  Germany ......................... A01K 5/02
9313652  7/1993  WIPO ............................. A01K 5/02

*Primary Examiner*—Edgar S. Burr
*Assistant Examiner*—Dave A Ghatt
*Attorney, Agent, or Firm*—Ladas & Parry

[57] ABSTRACT

A feeding device (1) for feeding hogs and pigs. The feeding device (1) consists of a tube (2) mounted on a frame (7) which is fixedly mounted on a base (3). The tube (2) is suspended in at least two members (5, 6); in a suspension member (5) and a guiding member (6). The tube (2) is suspended freely rotatably in the suspension member (5). The guiding member (6) may be displaced in vertical direction on the frame (7) and is provided on its inner side with an elastic, flexible annular body (10). The elastic flexible, annular body (10) of the guiding member (6) will actuate the tube (2) so that after a swing it will return to its neutral, vertical original position. This feature combined with the vertical displacement of the guiding member (6) makes the feeding device easily adaptable to animals of different sizes.

8 Claims, 1 Drawing Sheet

FEEDING DEVICE

BACKGROUND OF THE INVENTION

1. Field of the Invention

The present invention relates to a feeding device for feeding animals, especially hogs and pigs, said feeding device comprising a base designed with a trough over which, on a frame fastened to the base, a tube is suspended, said tube constituting at its upper end a container for storing feed and at its lower end a dispenser unit for dispensing the feed, said tube being suspended and guided at least two members, an upper suspension member and a lower guiding member, the upper suspension member is fixedly mounted on the upper part of the frame and the tube is suspended on the frame in the upper suspension member, said tube is mounted non-adjustable and non-displaceable in the vertical direction in relation to said upper suspension member,

2. Description of Related Art

A feeding device for feeding hogs and pigs is known from WO-93/13652. The feeding device comprises a base on which a trough is formed. Mounted on this base is a frame partitioning the trough. On this frame and directly over the centre of the trough a tube is mounted. This tube serves as a feed dispenser at its bottom and as a feed container at its top.

The function of the feeding device is such that the animal, when hungry, presses its snout against the dispenser part in order to displace it. This is possible since the dispensing part is made from an elastic flexible material. The deflection of the tube will result in a larger opening between the trough and the opening of the tube, and feed will be dispensed onto the trough, However, a feeding device of the above-mentioned type involves disadvantages. Among other things, it has turned out to be difficult to provide an elastic flexible tube for a young pig, Firstly, it is hard to modify the physical properties of the feeding device so as to adapt it optimally to the forces which the animals exert on the tube, i.e. the sizes of the animals, Secondly, the tube will be costly in production since an elastic flexible material is relatively expensive. Thirdly, it is not possible in a simple manner to adjust the amount of feed to be dispensed from the tube.

FR 2,660,155 describes another feeding device also with a flexible tube, mounted inside a rigid tube. The function of the feeding device is, however, similar to the function of the feeding device described above and thus exhibits the same disadvantages.

DE 2,652,788 describes a feeding device, which is provided with an annular ring around a stiff tube. The amount of feed that is determined by the angle to which the stiff tube can be pivoted. This angle is determined by the ring, the lower it is put, the smaller the angle the tube can make, the less feed comes out of the tube.

All the feeding devices described control the amount of food being led to the trough by adjusting the distance between the outlet of the feeding tube and the trough. This adjustment is made by a vertical movement of the feeding tube.

SUMMARY OF THE INVENTION

It is the object of the present invention to provide a feeding device which is simple and inexpensive in production, a feeding device wherein it is easy to adjust the dispensed amount of feed, and a feeding device which is adaptable so as to suit the sizes of the animals.

This object is achieved by a feeding device of the kind mentioned in the introduction which is characterized in that the tube is essentially stiff, and that the lower guiding member comprises an elastic, flexible, preferably annular, member so that the lower end of the tube may be displaced horizontally in relation to the trough.

The feeding device according to the present invention is an improved and alternative solution to the problems, underlying the above-mentioned feeding device according to WO 93/13652.

With a feeding device of this type it is possible to produce a feeding device
- Wherein the tube may be produced from an inexpensive stiff material,
- wherein the adjustment of the desired amount of feed being dispensed is uncomplicated simply by displacing the tube vertically, and
- wherein the adaptation to the sizes of the animals is accomplished in an uncomplicated manner simply by exchanging the elastic flexible annular body.

The above-mentioned features are obtained by suspending the stiff tube, at is upper end, in an annular suspension member, freely rotatably on the frame, and by guiding it underneath said suspension member in the lower flexible elastic guiding member. The desired swing of the tube and the resulting dispensing of feed is obtained in that the inner side of the annular body which contacts the tube comprises an annular flexible elastic material. After a swing and dispensing of feed this causes the tube to become actuated so that it resumes its neutral vertical original position.

The vertical position of the guiding ring on the frame may be varied, and the inside diameter of the guiding ring may be varied, and the elasticity of the elastic flexible material may be varied. This makes it possible for a standard feeding device according to the present invention to be adapted to animals of virtually all sizes. Thus, the feeding device may also be adapted for use by the other animals than pigs.

DESCRIPTION OF THE DRAWINGS

The present invention will be explained in further detail below with reference to the accompanying drawing showing a feeding device according to the present invention.

DESCRIPTION OF THE PREFERRED EMBODIMENTS

Figure 1:
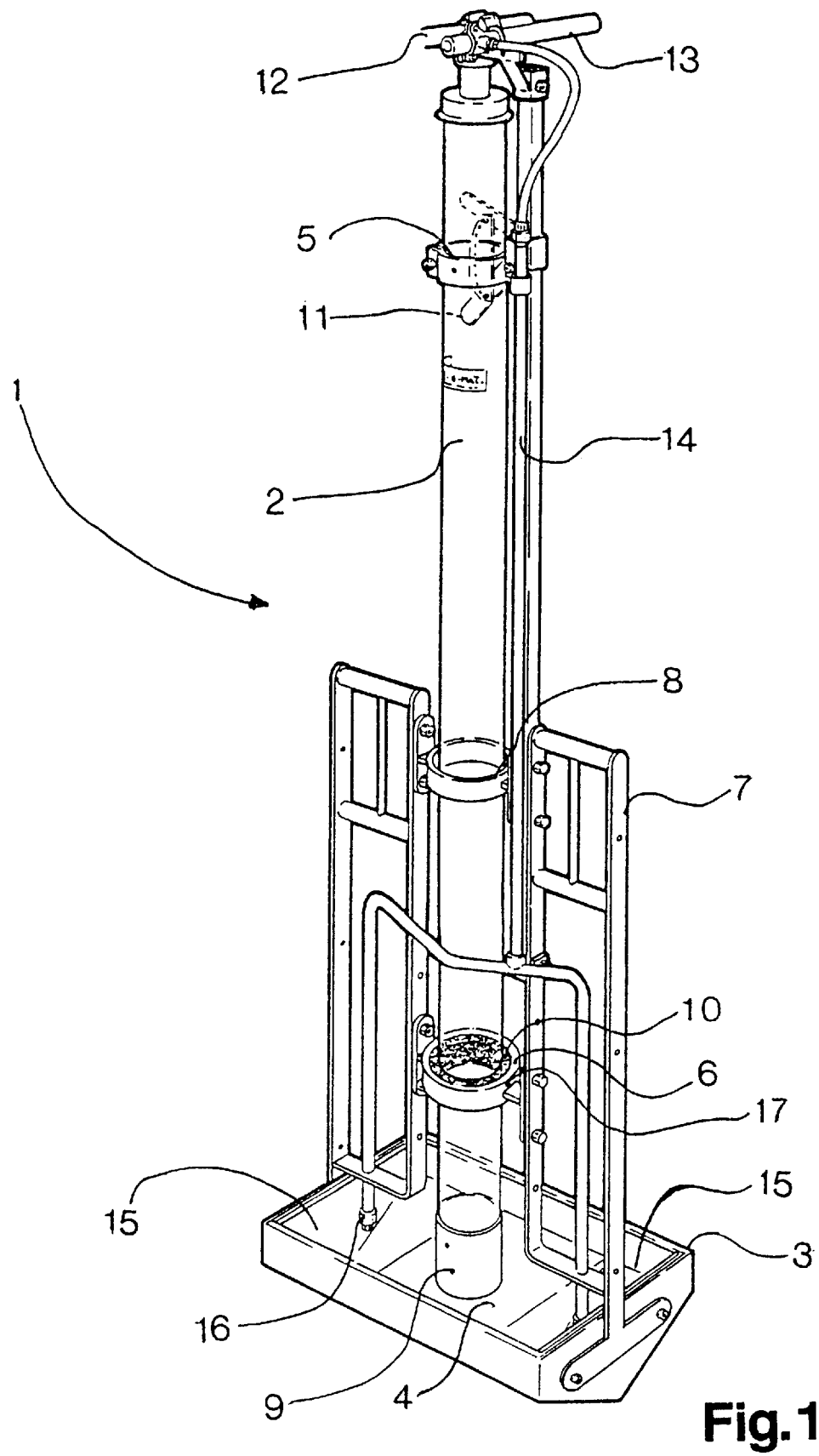

The drawing shows a feeding device 1 according to the present invention. The feeding device comprises a tube 2 located immediately above a base 3 which is formed with a trough 4. The tube 2 is mounted on a frame 7 by means of two annular members 5 and 6. The upper member is a suspension member 5 mounted freely rotatably on the frame 7. The lower one is a guiding member 6 mounted on the frame 7. The guiding member 6 may be displaced in vertical direction on the frame 7. The member 8 is an assembly member between the two halves of the frame 7. This member may be omitted if the frame 7 is stiff in itself.

As shown in the drawing the bottom of the tube 2 is protected by a metal cylinder or ring 9.

The guiding member 6 of the illustrated embodiment consists of a stiff annular circular holder 17 in which an elastic flexible annular body 10 is mounted. By means of a handle 11 the suspension member 5 may be displaced in vertical direction in relation to the frame 7 so as to place the tube in the desired position, i.e. from totally closed (contacting the trough) to its maximal height above the trough 4.

A feeding device of this type is connect at the top of the tube 2 to a pipe 12 for automatic filling of feed and a water pipe 13. The water pipe 13 is connected to a hose 14 fixed to the frame 7. The hose 14 is bifurcated further down the frame 7. Either of these two branches lead into a hollow 15 formed in the base 3. The hollows 15 are provided on either side of the trough 4. At its end the hose 14 is equipped with a nozzle 16 which, when actuated, e.g, by a snout, allows the passage of water.

Inside at its bottom the holder 1 7 according to a particularly preferred embodiment is provided with an annular recess extending toward the centre of the holder 17. This is advantageous since it is then not necessary to fasten the elastic flexible annular body 10 to the holder 17, e.g. by means of glue. The elastic flexible annular body 10 will thus be easily replaceable if it is desired to use a different body 10 with modified flexibility. This makes it possible easily to adapt the feeding device to animals of different sizes. It is easy to form the body 10 from a rod-shaped flexible body which is folded and placed in the recess of the holder 17.

The holder 17 may further be provided with a bead at its upper edge in order to ensure that the body 10 does not unintendedly slide out of the holder.

This easy access to exchange of the elastic flexible annular body 10 of the guiding member 6 is what ensures that the feeding device may quickly be adapted to different sizes of animals.

Alternatively, the guiding member 6 is made of a ring provided with elastic flexible straps which are fastened to the frame 7. A guiding member of this type will normally be provided with 2, 4 or 6 straps.

I claim:

1. A feeding device for feeding animals, especially hogs and pigs, said feeding device comprising a horizontal base with a trough, an upright frame fastened to the base, a tube suspended in said frame, said tube constituting at its upper end a container for storing feed and at its lower end a dispenser unit for dispensing the feed, said tube being suspended by an upper suspension member and guided by a lower guiding member, the upper suspension member being fixedly mounted on an upper part of the frame, the tube being pivotably suspended on the frame in the upper suspension member, said tube being mounted in a preselected vertical position in relation to said upper suspension member, the tube being generally rigid, and the lower guiding member comprising an elastic, flexible, annular member to permit the lower end of the tube to be displaced horizontally in relation to the trough.

2. A feeding device according to claim 1, wherein the tube is provided at its lower end with a rigid protective ring.

3. A feeding device according to claim 2, wherein said assembly member is mounted detachably on the tube.

4. A feeding device according to claim 1, including a rigid annular member having an annular recess wherein the flexible annular member is formed by a flexible sleeve which has been folded and is located in the annular recess in the rigid annular holder.

5. A feeding device according to claim 1, including an assembly member for holding an upper part of the frame and mounted on the frame above the lower guiding member.

6. A feeding device according to claim 1, wherein the tube is manufactured from a hard plastic material.

7. A feeding device according to claim 1, including a movable handle mounted in the suspension member to enable adjustment of the vertical position of the tube.

8. A feeding device according to claim 1, including two adjacent sites, wherein the frame divides the base into the two adjacent sites and constitutes part of a partition between the adjacent sites.

* * * * *